United States Patent
Appold et al.

(10) Patent No.: US 10,673,122 B2
(45) Date of Patent: Jun. 2, 2020

(54) VEHICLE COMMUNICATION MODULE WITH IMPROVED TRANSMISSION

(71) Applicant: Gentex Corporation, Zeeland, MI (US)

(72) Inventors: Benjamin P. Appold, Spring Lake, MI (US); Douglas C. Papay, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/164,937

(22) Filed: Oct. 19, 2018

(65) Prior Publication Data

US 2019/0123421 A1    Apr. 25, 2019

Related U.S. Application Data

(60) Provisional application No. 62/575,052, filed on Oct. 20, 2017.

(51) Int. Cl.
| | | |
|---|---|---|
| *H01Q 1/12* | (2006.01) | |
| *H01Q 1/32* | (2006.01) | |
| *H04B 1/08* | (2006.01) | |
| *G07B 15/06* | (2011.01) | |
| *H01Q 13/10* | (2006.01) | |
| *H04B 1/03* | (2006.01) | |

(52) U.S. Cl.
CPC ......... *H01Q 1/1271* (2013.01); *H01Q 1/3291* (2013.01); *H01Q 13/10* (2013.01); *H04B 1/03* (2013.01); *H04B 1/082* (2013.01); *G07B 15/063* (2013.01)

(58) Field of Classification Search
CPC .... H01Q 1/1271; H01Q 1/3291; H01Q 13/10; G07B 15/063; H04B 1/03; H04B 1/082
See application file for complete search history.

(56) References Cited

U.S. PATENT DOCUMENTS

| | | | | |
|---|---|---|---|---|
| 3,793,590 A | * | 2/1974 | Etling | H01Q 1/1271 455/142 |
| 5,739,794 A | * | 4/1998 | Nagy | B32B 17/10036 343/711 |
| 5,898,407 A | * | 4/1999 | Paulus | B32B 17/10 343/713 |

(Continued)

*Primary Examiner* — Thomas D Alunkal
(74) *Attorney, Agent, or Firm* — Price Heneveld LLP; Bradley D. Johnson (57) ABSTRACT

A communication apparatus for a vehicle is disclosed. The apparatus comprises a window comprising a metallic coating and forming an interior surface enclosing a portion of an interior compartment of the vehicle. The apparatus further comprises a wireless communication circuit comprising an antenna configured to communicate via a radio frequency. The antenna comprises an electrical conductor and a plurality of elongated openings formed in the metallic coating. The electrical conductor extends in a first direction and is in conductive connection with the communication circuit. The electrical conductor is disposed proximate to the interior surface of the window. The elongated openings extend in a second direction substantially perpendicular to the first direction. The elongated openings in combination with the electrical conductor provide for an improved transmission of the radio frequency.

21 Claims, 7 Drawing Sheets

(56) References Cited

U.S. PATENT DOCUMENTS

| | | | | |
|---|---|---|---|---|
| 6,275,157 | B1* | 8/2001 | Mays | B32B 17/06 |
| | | | | 340/572.5 |
| 9,007,215 | B2* | 4/2015 | Zhu | G06K 19/07749 |
| | | | | 340/572.8 |
| 2003/0164801 | A1* | 9/2003 | Jordan | H01Q 1/1271 |
| | | | | 343/713 |
| 2004/0119644 | A1* | 6/2004 | Puente-Baliarda | |
| | | | | H01Q 1/1271 |
| | | | | 343/700 MS |
| 2006/0139223 | A1* | 6/2006 | Li | H01Q 1/1271 |
| | | | | 343/713 |
| 2012/0154229 | A1* | 6/2012 | Kagaya | H01Q 1/1271 |
| | | | | 343/713 |
| 2014/0266931 | A1* | 9/2014 | Shkembi | H01Q 1/3291 |
| | | | | 343/712 |
| 2015/0357700 | A1* | 12/2015 | Kagaya | H01Q 1/285 |
| | | | | 343/713 |
| 2016/0006112 | A1* | 1/2016 | Kagaya | H01Q 1/285 |
| | | | | 343/712 |
| 2016/0013539 | A1* | 1/2016 | Shkembi | H01Q 1/3291 |
| | | | | 343/713 |
| 2017/0113619 | A1* | 4/2017 | Boehm | G07B 15/063 |

* cited by examiner

VEHICLE COMMUNICATION MODULE WITH IMPROVED TRANSMISSION

CROSS-REFERENCE TO RELATED APPLICATION

This application claims the benefit of and priority to U.S. Provisional Patent Application No. 62/575,052, filed on Oct. 20, 2017, entitled VEHICLE COMMUNICATION MODULE WITH IMPROVED TRANSMISSION, the entire disclosure of which is hereby incorporated herein by reference.

TECHNOLOGICAL FIELD

The disclosure relates to a communication module and, more particularly, relates to a wireless communication module for a vehicle.

BRIEF SUMMARY

In an exemplary embodiment, a wireless communication apparatus for a vehicle is disclosed. The apparatus comprises a window that includes a metallic coating. The window forms an interior surface enclosing a portion of an interior compartment of the vehicle. The apparatus further comprises a wireless communication circuit comprising an antenna configured to communicate via a radio frequency. The antenna comprises an electrical conductor and a plurality of elongated openings formed in the metallic coating. The electrical conductor extends in a first direction and is in conductive connection with the communication circuit. The electrical conductor is disposed proximate to the interior surface of the window. The elongated openings extend in a second direction substantially perpendicular to the first direction. The elongated openings in combination with the electrical conductor provide for an improved transmission of the radio frequency.

In another embodiment, a method for communicating wirelessly from a vehicle passenger compartment through a windshield comprising a metallic coating is disclosed. The method comprises conducting a radio frequency transmission via an electrical conductor to an active antenna element extending proximate to an interior surface of the windshield. The method further comprises wirelessly transmitting the radio frequency transmission from the active antenna element to a parasitic antenna element. The parasitic element comprises a plurality of elongated openings formed in the metallic coating of the windshield. The method further comprises emitting the radio frequency transmission from the parasitic antenna element outward from the windshield relative to the passenger compartment.

In yet another embodiment, a communication apparatus for a vehicle is disclosed. The apparatus comprises a window comprising a metallic coating and forming an interior surface enclosing a portion of an interior compartment of the vehicle. The apparatus further comprises a wireless communication circuit comprising an antenna configured to communicate via a radio frequency. The antenna comprises an electrical conductor in conductive connection with the communication circuit. The electrical conductor is disposed extending parallel to the interior surface and extending in a first direction. A plurality of elongated openings are formed in the metallic coating extending in a second direction forming a height of the elongated openings substantially perpendicular to the first direction. The electrical conductor extends centrally along the height of the elongated openings.

These and other features, advantages, and objects of the present disclosure will be further understood and appreciated by those skilled in the art by reference to the following specification, claims, and appended drawings.

DETAILED DESCRIPTION

Figure 1:
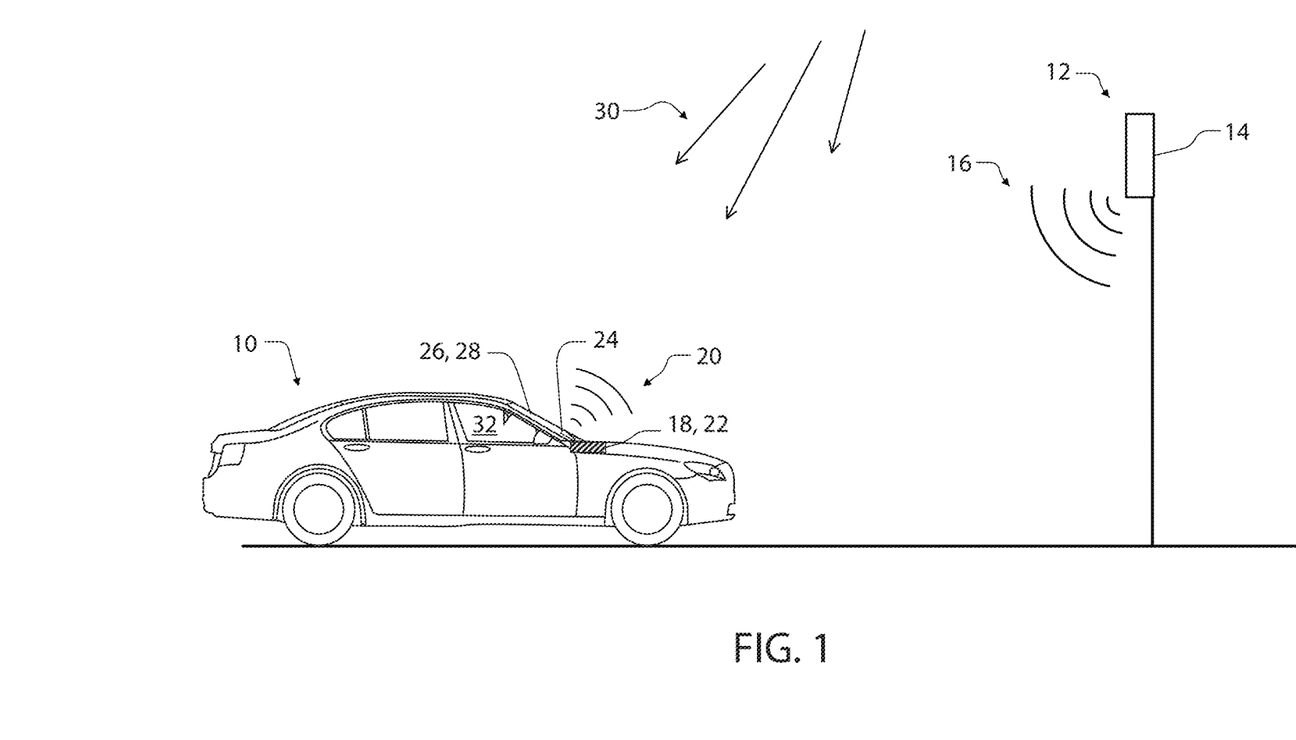
FIG. 1 is a perspective view of a vehicle comprising a communication module entering a toll station.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 is shown approaching a toll station 12 comprising a toll reader 14. The toll reader 14 may be configured to emit a first wireless signal 16 configured to activate a communication module 18 of the vehicle 10. In this way, the communication module 18 may identify a proximity to the toll station 12 and communicate an identification code via a second wireless signal 20. In response to receiving the second wireless signal 20, the toll reader 14 may record the identification code and apply a toll or fee to an account associated with the vehicle 10. In an exemplary embodiment, each of the wireless signals 16 and 20 may correspond to polarized radio frequency signals (e.g. horizontally or vertically polarized signals). Though the recordation and application of the toll or fee is described as being processed by the toll reader 14, it shall be understood that these functions may similarly be processed by various systems or servers in communication with the toll reader 14.

In order to identify a timing to emit the second wireless signal 20, the communication module 18 may comprise a communication circuit 22 (e.g. a transceiver circuit) configured to monitor for the first wireless signal 16. The communication circuit 22 may comprise an antenna 24 disposed proximate to an interior surface of a windshield 26 of the vehicle 10. The windshield 26 may comprise a metallic coating 28, which may be deposited, laminated, or otherwise applied to on one or more substrates forming the windshield 26. The metallic coating 28 may correspond to silver and/or metallic oxides sputtered or otherwise deposited on the transparent substrates of the windshield 26. In this configuration, the metallic coating 28 may provide for a spectrally selective filter to control or limit solar radiation 30 from entering a passenger compartment 32 of the vehicle 10. In some embodiments, the metallic coating 28 may further be supplied with electrical current to heat and defog or defrost the windshield 26. Though discussed in reference to the windshield 26 of a passenger vehicle, the communication circuit 22 and antenna 24 may be similarly utilized for any window comprising the metallic coating 28.

While the metallic coating 28 may provide the benefit of limiting the solar radiation 30 entering the passenger compartment 32, the metallic coating 28 may also attenuate or restrict the radio frequency (RF) signals (e.g. the first wireless signal 16 and the second wireless signal 20) from passing through the windshield 26. The disclosure provides for a beneficial arrangement of the antenna 24 that limits the attenuation of the RF signals while maintaining the benefits of the metallic coating 28. In some embodiments, the disclosure provides for methods not only capable of passing the RF signals, but further improving the performance of the communication circuit 22 by utilizing the metallic coating 28 to improve or amplify the transmission of the RF signals through the windshield 26.

In operation, the communication module 18 may have two transmission modes. In an active mode, the communication module 18 may utilize a powered transmitter to send a signal to the toll reader 14. Additionally, in a passive mode, the communication module 18 may utilize an impedance match or mismatch to reflect a signal received from toll reader 14. Accordingly, the communication module 18 may be optimized to communicate with the toll reader 14 through the windshield 26 comprising the metallic coating 28.

Though particularly described in reference to the toll reader 14, the disclosure may provide for similar configurations to be utilized with various wireless communication modules. For example, the communication circuit 22 and antenna 24 as discussed herein may be configured to communicate with various forms of wireless communication modules, including, but not limited to, wireless payment modules, wireless access modules, wireless security modules, and various other wireless communication devices. Accordingly, the systems provided by the disclosure may be utilized to improve the transmission of wireless signals for various applications. Such applications may include communications with payment stations, access barriers, security systems, and various other systems or devices configured to communicate wirelessly.

Figure 2:
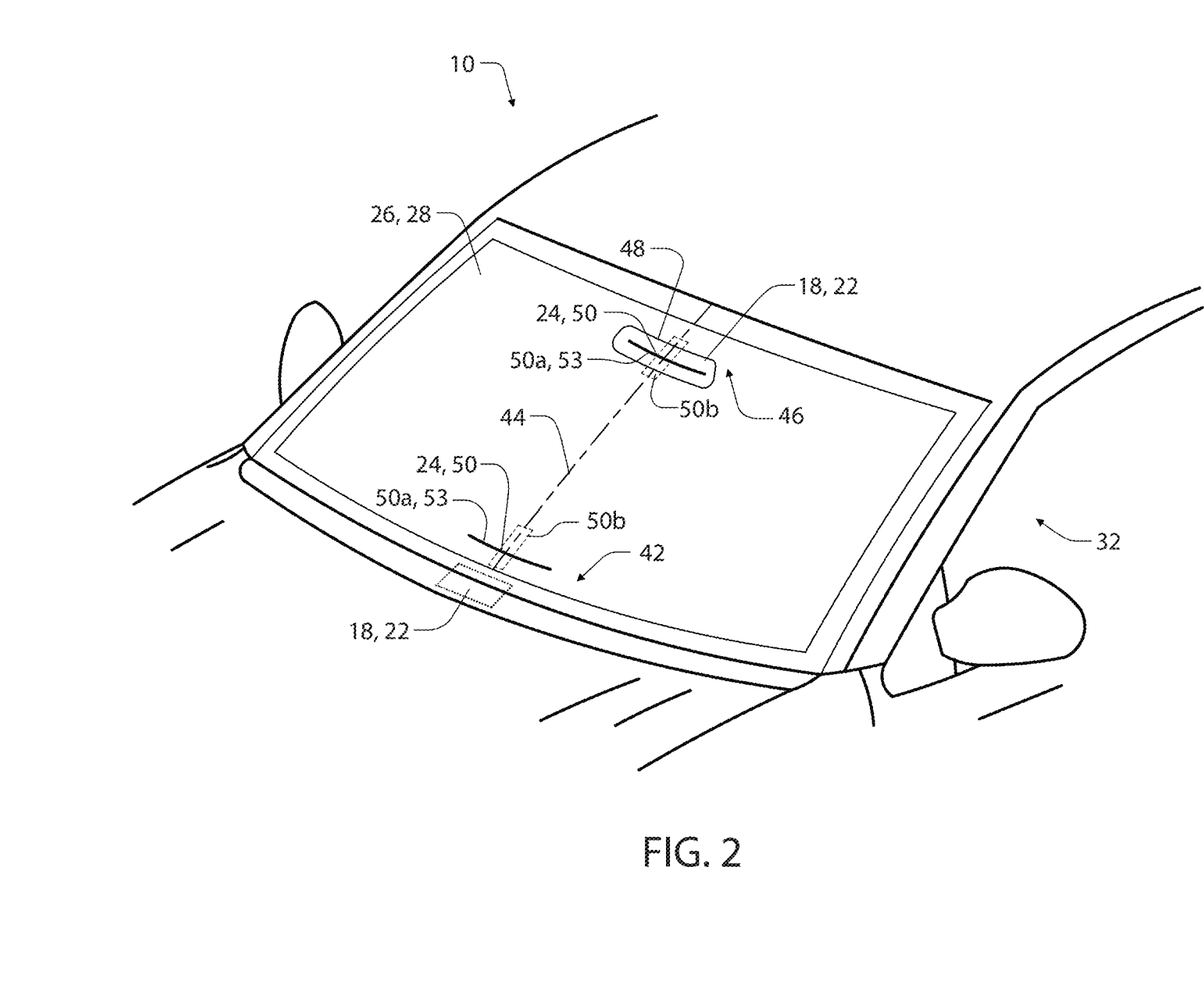
FIG. 2 is a perspective view of a vehicle windshield demonstrating an antenna configuration of a communication module.
Figure 3A:
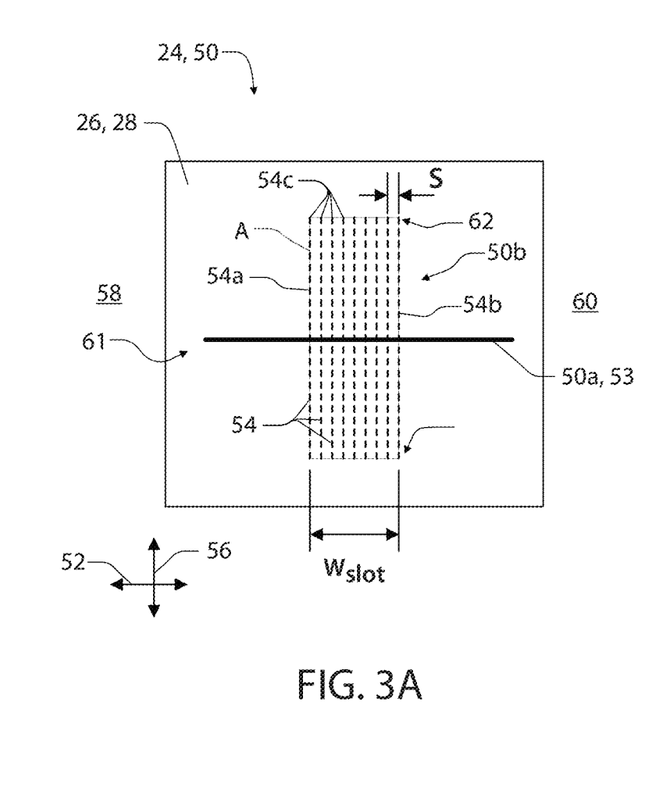
FIG. 3A is a detailed front schematic view of an antenna for a communication module.
Figure 3B:
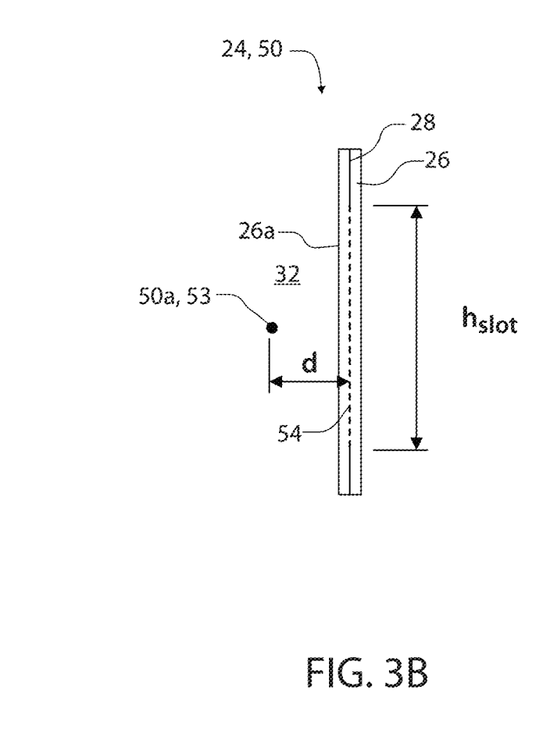
FIG. 3B is a side cross-sectional view of an antenna for a communication module.

Referring now to FIGS. 2, 3A and 3B, exemplary embodiments of the antenna 24 are shown in connection with the windshield 26. In some embodiments, the antenna 24 may be located proximate to a bottom portion 42 of the windshield 26 near a centerline 44 of the windshield 26. The antenna 24 may also be located proximate an upper portion 46 of the windshield 26 proximate to the centerline 44. In such embodiments, the antenna 24 may be conductively connected to the communication circuit 22, which may be disposed in an interior mirror assembly 48 or display mirror in connection with or disposed proximate to an interior surface 26a of the windshield 26. Though specific locations (e.g. proximate the centerline 44) of the antenna 24 are discussed in reference to the exemplary embodiments, the antenna 24 may be positioned in a variety of locations proximate the windshield 26 or any other glass portion (e.g. window, sunroof, etc.) of the vehicle 10 without departing from the spirit of the disclosure.

In some embodiments, the antenna 24 may correspond to a multi-element antenna array 50. The antenna array 50 may comprise an active component 50a (e.g. a source element) and a passive component 50b (e.g. a parasitic element). The active component 50a may extend substantially in a first direction 52, which may be horizontal or parallel to an operating surface of the vehicle 10. The active component 50a may be formed by an electrical conductor 53 extending proximate to the interior surface 26a. The active component 50a or source antenna may be implemented in a variety of configurations, including, but not limited to, a dipole antenna (e.g. folded dipole, bent arm dipole, vee dipole, bow-tie, etc.), a monopole antenna, and planar structures of any type (e.g. planar inverted F antennas (PIFA) or patch antennas). The active component 50a may be printed on a circuit board or other substrate. The active component 50a may also be formed by a wire, a metal stamping, a metal extrusion, or made up of a parallel metal plate separated by a dielectric (e.g. air, polymers, plastics, etc.) such as a ceramic patch antenna.

In various embodiments, the electrical conductor 53 may be any shape that results in a specific radiation emission direction/polarization. The improved transmission of the antenna 24 may be the result of a directional radiation pattern formed by the combination of the active component 50a and the passive component 50b. The passive component 50b of the antenna 24 may be formed as a portion of the metallic coating 28. In general, the passive component 50b may be formed by one or more openings in the metallic coating 28. For example, the passive component 50b may comprise a plurality of elongated openings 54 extending longitudinally in a second direction 56. The second direction 56 may be substantially perpendicular to the first direction 52 such that the elongated openings 54 formed in the metallic coating 28 are aligned substantially vertical along windshield 26.

As discussed herein, the term substantially may provide for a nominal range of measurements that may effectively provide for variations in precision and design while still achieving the beneficial configurations of the elements discussed herein. Accordingly, an object that is described as being substantially perpendicular in relative orientation may vary 5 to 10 degrees without departing from the spirit of the disclosure. Though the active component 50a is described as horizontal and the passive component 50b is described as vertical in this particular embodiment, the active component 50a may be vertical and the passive component 50b may be horizontal in some embodiments. Accordingly, the disclosure may provide for the antenna 24 to be utilized for vertically or horizontally polarized signals.

The elongated openings 54 may extend substantially parallel to each other and define a horizontal width or slot width $w_{slot}$ of the passive component 50b. The slot width $w_{slot}$ of the passive component 50b may extend from a first opening 54a closest to a passenger-side 58 of the vehicle 10 to a second opening 54b closest to a driver-side 60 of the vehicle 10. Between the first opening 54a and the second opening 54b, and at least one intermediate opening 54c may be formed in a spaced configuration. In some embodiments, the intermediate opening 54c may comprise a plurality of intermediate openings 54c. In such embodiments, the intermediate openings may be evenly spaced between the first opening 54a and the second opening 54b.

The elongated openings 54 further define a height or slot height $h_{slot}$ of the passive component 50b. The slot height $h_{slot}$ may extend in a second direction 56 and intersect with the first direction 52 (e.g. the horizontal direction) of the active component 50a. In some embodiments, the active component 50a may be positioned along a central portion 61 of the elongated openings 54 such that the slot height $h_{slot}$ extends on both sides of the active component 50a. Additionally, the active component 50a may be positioned a spacing distance d from the interior surface 26a of the windshield 26. In this configuration, the passive component 50b may receive signals uniformly along the slot height $h_{slot}$.

The elongated openings 54 may be formed in the metallic coating 28 via an ablation or removal process. For example, the ablation process may utilize a laser to selectively remove the metallic coating 28 from the substrates of the windshield 26 by directing a laser beam at the metallic coating 28. The laser beam may be configured to deliver a controlled amount of energy at a laser spot defined where the beam impinges a desired surface. This controlled amount of energy is selected to liquefy, vaporize, or otherwise rapidly expand the surface material (e.g. the metallic coating 28) at the laser spot to cause it to be removed. Though laser ablation is discussed as a process capable of providing the elongated openings 54, various other processes may be utilized without departing from the spirit of the disclosure. For example, the elongated openings 54 may be produced by masking the area of the elongated openings 54 during the coating process rather than removing the metallic coating 28 after the coating process.

As demonstrated in FIGS. 3A and 3B, the elongated openings 54 form a rectangular surface area A or slot-like shape on the windshield 26. In an exemplary embodiment, the slot height $h_{slot}$ may be greater than the slot width $w_{slot}$ of the passive component 50b. This configuration may be important to the operation of the passive component 50b. Additionally, to maintain effective transmission of the RF signals (e.g. the first wireless signal 16 and the second wireless signal 20), the slot height $h_{slot}$ may be less than twice a wavelength of the target frequency. For example, if the target frequency of the wireless signals 16 and 20 is 910 MHz, the slot height $h_{slot}$ may be less than less than 692 mm (twice the target frequency's wavelength in free space). In some embodiments, the slot height $h_{slot}$ may be less than half of the target wavelength. As discussed herein, the antenna 24 may be configured to effectively transmit RF signals over a variety of frequencies. For example, the antenna 24 may be configured to communicate in the MHz or GHz range (e.g. 900 MHz, 915 MHz, 2.4 GHz, 5 GHz, etc.).

In various embodiments, the elongated openings 54 of the passive component 50b may correspond to narrow slots that may be ablated or otherwise formed in the metallic coating 28. In various embodiments, the elongated openings 54 may be formed in the metallic coating having an opening width less than 1 mm. The opening width may extend along the first direction 52 and form the elongated opening 54 along the slot height $h_{slot}$. In some embodiments, the opening width may be less than 0.5 mm or less than 0.2 mm. In an exemplary embodiment, the opening width may be less than 0.1 mm.

The elongated openings 54 may be spaced apart having a spacing distance S that may range from 0.1 mm to 25 mm. The spacing distance S between each of the elongated openings 54 may maintain the metallic coating 28 extending from a top extent 62 to a bottom extent 64 of the passive component 50b. In this configuration, the metallic coating 28 may extend uniformly between the elongated openings 54 over the spacing distance S such that electrical current may be conducted within the rectangular surface area A. In this way, a defrost capability of the metallic coating 28 may be maintained within the rectangular surface area A of the passive component 50b. In some embodiments, the metallic coating 28 may be maintained within the rectangular surface area A such that the elongated openings 54 extend over less than 20% of the rectangular surface area A. In this way, the defrost capability of the metallic coating 28 may be maintained over 80% or more of the rectangular surface area A.

Figure 4A:
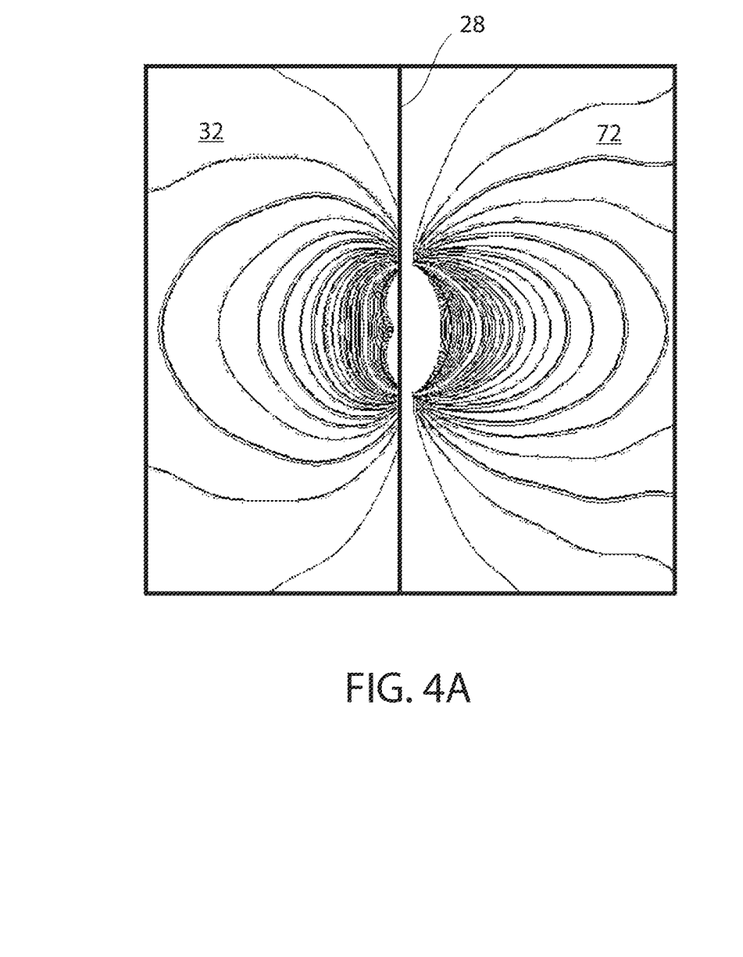
FIG. 4A is a plot of a simulation of the electric field transmitted from an improved antenna through a metallic coating along a fore-aft side profile of the vehicle.
Figure 4B:
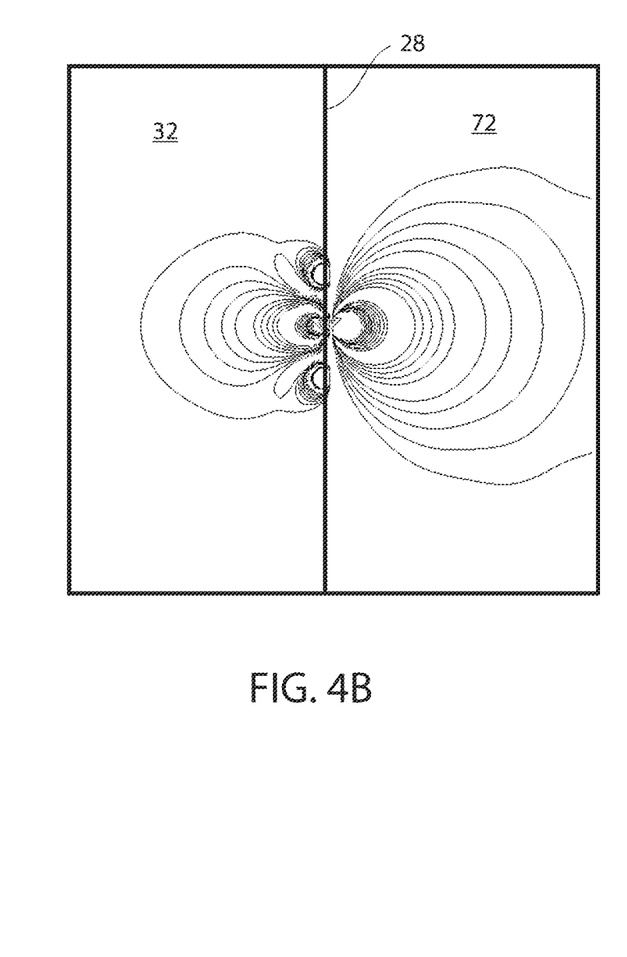
FIG. 4B is a plot of a simulation of the electric field transmitted from an improved antenna through a metallic coating along a fore-aft top profile of the vehicle.

Referring now to FIGS. 4A and 4B, plots of a simulation of the electric field transmitted from the antenna 24 through the metallic coating 28 are shown. FIG. 4A demonstrates the electric field along a fore-aft side profile of the vehicle 10, and FIG. 4B demonstrates the electric field along a fore-aft top profile of the vehicle 10. As a reference, the passenger compartment 32 and an exterior region 72 are shown in FIGS. 4A and 4B. Based on the simulated data, the electric field is greater in magnitude and range in the exterior region 72 outside the vehicle 10 than in the passenger compartment 32. Accordingly, the simulation demonstrates that the interaction of the active component 50a and the passive component 50b of the antenna array 50 provide for improved operation of the communication circuit 22.

Figure 5A:
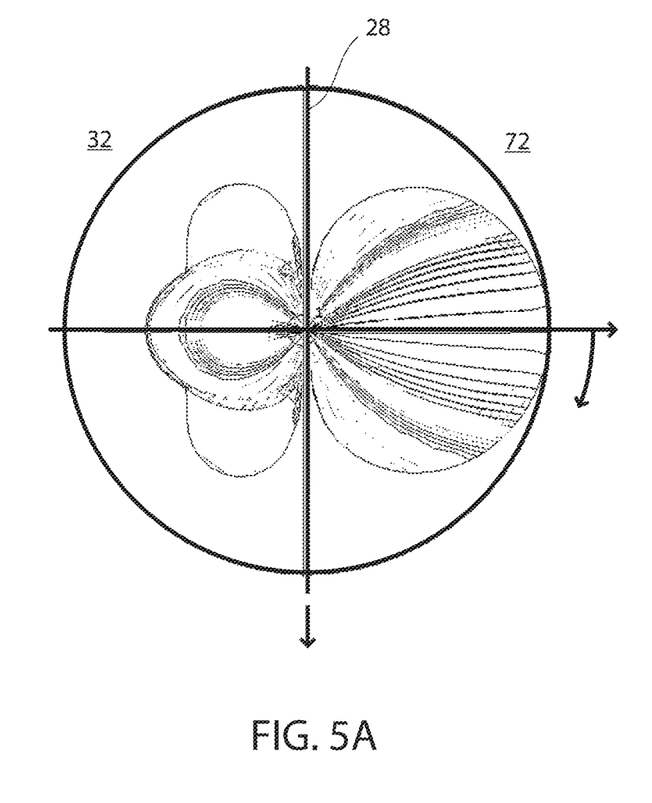
FIG. 5A is a plot of a far field simulation of the transmission of an improved antenna through a metallic coating along a fore-aft side profile of the vehicle.
Figure 5B:
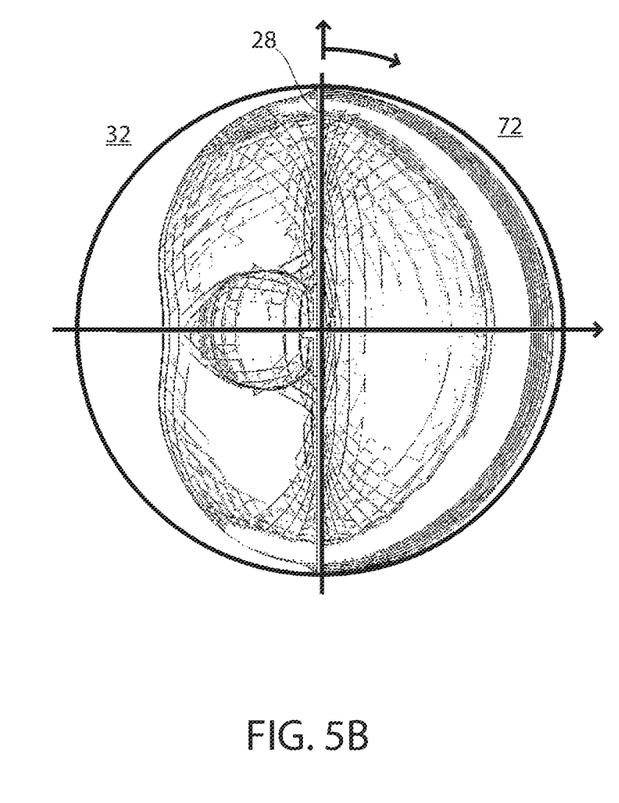
FIG. 5B is a plot of a far field simulation of the transmission of an improved antenna through a metallic coating along a fore-aft top profile of the vehicle.

Referring now to FIGS. 5A and 5B, plots of a far field simulation of the transmission of the antenna 24 through the metallic coating 28 are shown. FIG. 5A demonstrates the far field simulation along a fore-aft side profile of the vehicle 10, and FIG. 5B demonstrates the far field simulation along a fore-aft top profile of the vehicle 10. As a reference, the passenger compartment 32 and an exterior region 72 are shown in FIGS. 5A and 5B. The far field simulation provides similar results to the electric field simulation. As shown, the far field is also greater in magnitude and range in the exterior region 72 outside the vehicle 10 than in the passenger compartment 32.

Figure 6A:
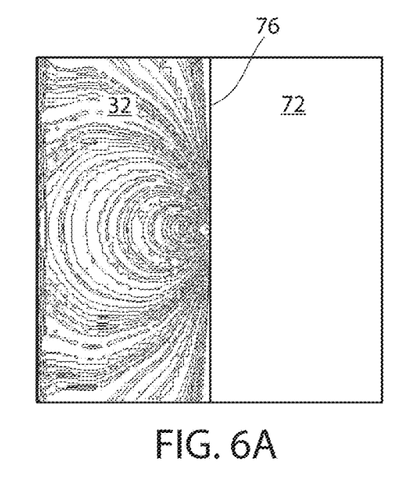
FIG. 6A is a plot of a simulation of the electric field transmitted from a conventional antenna through a metallic coating along a fore-aft side profile of the vehicle.
Figure 6B:
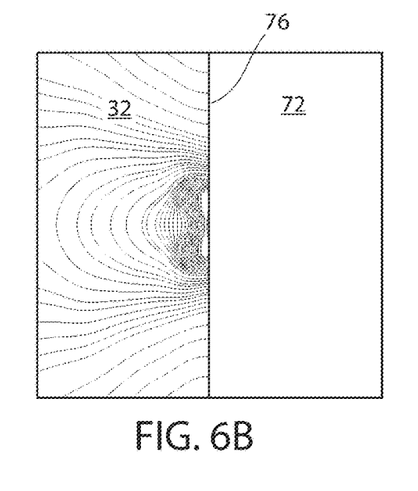
FIG. 6B is a plot of a simulation of the electric field transmitted from a conventional antenna through a metallic coating along a fore-aft top profile of the vehicle.
Figure 7A:
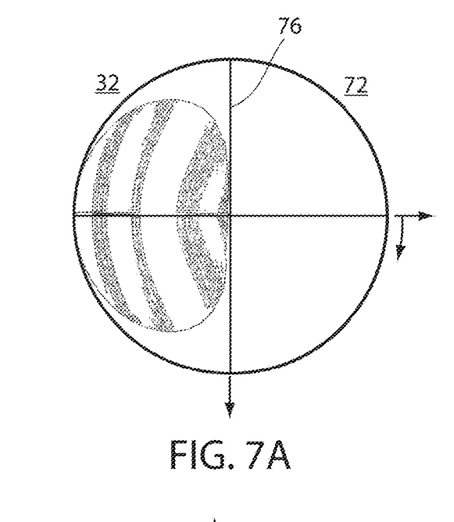
FIG. 7A is a plot of a far field simulation of the transmission of a conventional antenna through a metallic coating along a fore-aft side profile of the vehicle.
Figure 7B:
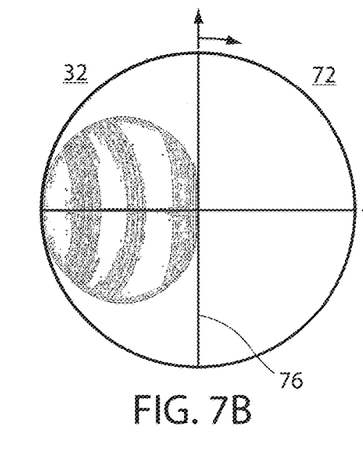
FIG. 7B is a plot of a far field simulation of the transmission of a conventional antenna through a metallic coating along a fore-aft top profile of the vehicle.

Referring now to FIGS. 6A, 6B, 7A, and 7B, plots of simulations of an electric field (6A and 6B) and a far field transmitted (7A and 7B) from a conventional antenna positioned proximate a windshield 76 with a continuous metallic coating are shown. The results of FIGS. 6A, 6B, 7A, and 7B are provided to demonstrate the improvements provided by the antenna array 50 of the disclosure. FIGS. 6A and 7A demonstrate the fields along a fore-aft side profile of a vehicle. FIGS. 6B and 7B demonstrate the fields along a fore-aft top profile of a vehicle. In contrast with the results shown in FIGS. 4A, 4B, 5A, and 5B, the simulations for the conventional antenna shown in 6A, 6B, 7A, and 7B demonstrate that the transmissions are significantly and, in some cases, entirely inhibited by the metallic coating of the windshield 76. Based on the simulated data for the conventional antenna, the fields in each of the simulations is negligible in the exterior region 72 and fail to pass through the windshield 76 outside the vehicle. Accordingly, the results for the conventional antenna demonstrated in FIGS. 6A, 6B, 7A, and 7B demonstrate that the interaction of the active component 50a and the passive component 50b of the antenna array 50 provide for improved operation of the communication circuit 22.

Figure 8:
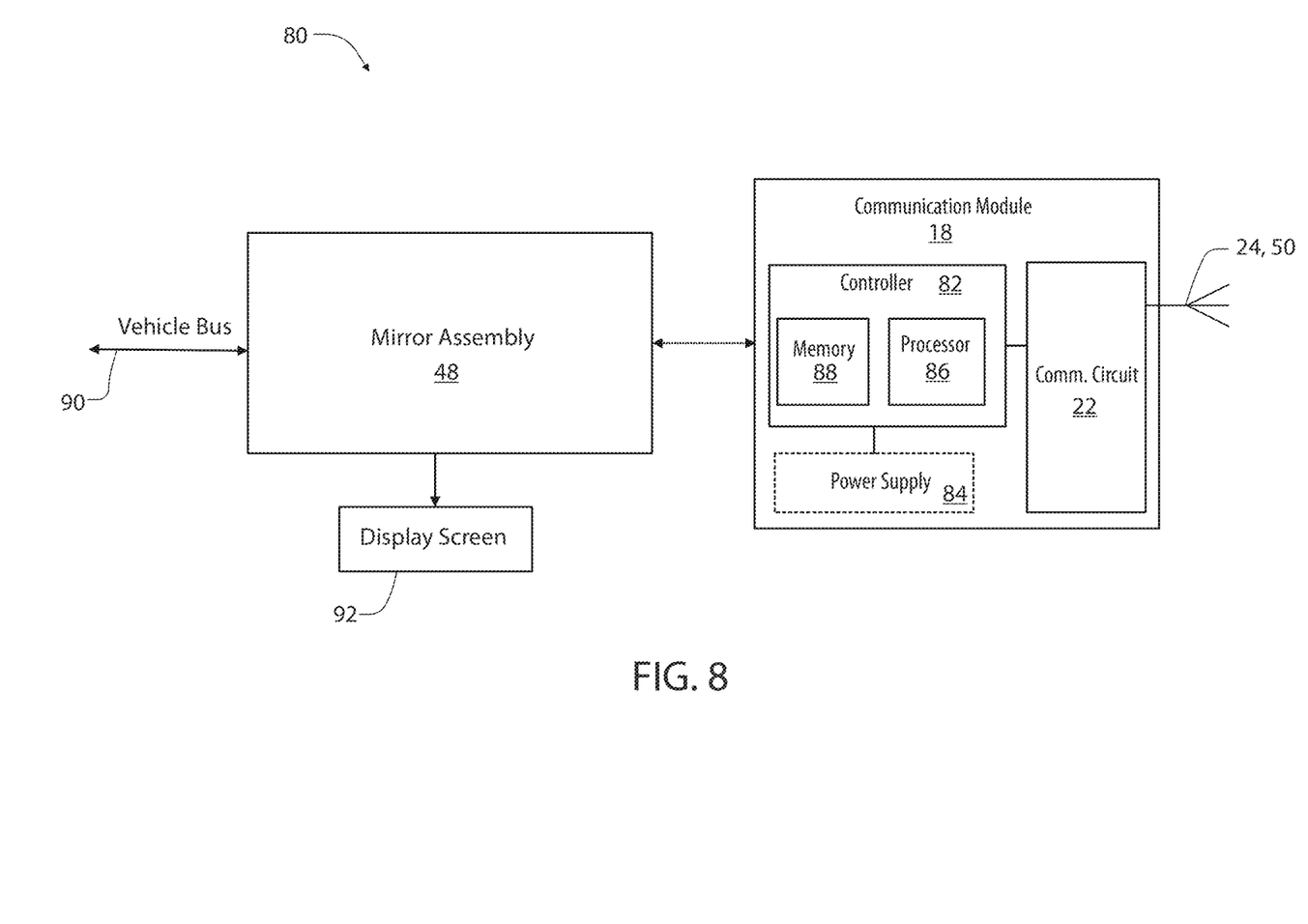
FIG. 8 is a block diagram demonstrating a communication system in accordance with the disclosure.

Referring now to FIG. 8, a block diagram of a communication system 80 comprising the communication module 18 is shown. The communication module 18 may comprise a controller 82 in communication with the communication circuit 22 and the antenna 24. The communication module 18 may be configured to draw power from a power supply 84. The power supply 84 may correspond to a dedicated battery of the communication circuit 22 or a direct current power supply from the vehicle 10.

As discussed herein, the controller 82 may be configured to control the communication circuit 22 to effectively communicate through the metallic coating 28 of the windshield 26. To support the various operations discussed herein, the controller 82 may comprise a processor 86 and a memory 88. The memory 88 may be configured to store one or more instructions to support the processing steps of the processor 86 in order to enable the various operations discussed herein.

The controller 82 of the communication module 18 may further be in communication with the interior mirror assembly 48 or other devices incorporated in the vehicle 10. In this configuration, the controller 82 may be operable to communicate via a vehicle communication bus 90. Accordingly, the controller 82 may be operable to communicate with a number of vehicle systems (e.g. a navigation system, vehicle control module, etc.). In some embodiments, the interior mirror assembly 48 may comprise a display screen 92. The display screen 92 may comprise any form of video screen, for example a light emitting diode (LED) display, organic LED display, liquid crystal display (LCD), etc. In this configuration, the controller 82 may display various forms of image or video data on the display screen 92. Though discussed in reference to the mirror assembly 48 of the vehicle 10, the communication module 18 may be implemented in various portions and in communication with various devices and systems of the vehicle 10 without departing from the spirit of the disclosure.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

The invention claimed is:

1. A communication apparatus for a vehicle comprising:
a window comprising a metallic coating;
a wireless communication circuit comprising an antenna configured to communicate via a radio frequency, the antenna comprising an electrical conductor in conductive connection with the communication circuit, the electrical conductor disposed interior to and in a spaced apart relationship with the metallic coating and extending in a first direction; and
wherein the window further comprises a plurality of elongated openings formed in the metallic coating extending in a second direction substantially perpendicular to the first direction, wherein the elongated openings in combination with the electrical conductor provide for an improved directional antenna configured to transmit the radio frequency.

2. The apparatus according to claim 1, wherein the electrical conductor forms at least one of a monopole antenna or dipole antenna.

3. The apparatus according to claim 1, wherein the electrical conductor is configured to communicate the radio frequency having a horizontal polarity.

4. The apparatus according to claim 1, wherein the first direction is substantially horizontal and parallel to an operating surface of the vehicle.

5. The apparatus according to claim 1, wherein the plurality of elongated openings are spaced along a horizontal width extending from a first opening closest to a passenger-side of the vehicle to a second opening closest to a driver-side of the vehicle.

6. The apparatus according to claim 5, wherein the plurality of elongated openings form a height extending in the second direction along the window and intersecting the antenna.

7. The apparatus according to claim 6, wherein the height is greater than the horizontal width.

8. The apparatus according to claim 6, wherein the height and the width form a rectangular surface area on the window, wherein the elongated openings extend over less than 80% of the rectangular surface area.

9. The apparatus according to claim 1, wherein the elongated openings are narrow slots extending perpendicular to the electrical conductor along the second direction, wherein each of the narrow slots extend along the height and form an opening width less than 0.5 mm through the metallic coating.

10. A method for communicating wirelessly from a vehicle passenger compartment through a windshield comprising a metallic coating, the method comprising:
conducting a radio frequency transmission via an electrical conductor to an active antenna element extending interior to and in a spaced apart relationship with the windshield;
wirelessly transmitting the radio frequency transmission from the active antenna element to a parasitic antenna element comprising a plurality of elongated openings formed in the metallic coating of the windshield; and
emitting the radio frequency transmission from the parasitic antenna element outward from the windshield relative to the passenger compartment.

11. The method according to claim 10, further comprising:
accessing the radio frequency transmission from a memory via a controller disposed in the vehicle.

12. The method according to claim 11, wherein the controller is disposed in a rearview mirror assembly.

13. The method according to claim 10, further comprising:
   receiving with the active antenna element via the parasitic antenna element a request signal from a toll module of a toll station.

14. The method according to claim 13, wherein the radio frequency transmission is transmitted in response to receiving the request signal.

15. The method according to claim 10, wherein the radio frequency transmission comprises an identification code configured to identify at least one of a vehicle or an occupant.

16. The method according to claim 15, further comprising:
   receiving the radio frequency transmission with a toll module of a toll station; and
   identifying the identification code from the radio frequency transmission.

17. The method according to claim 15, further comprising:
   recording an activity of the vehicle or occupant in response to identifying the identification code.

18. A communication apparatus for a vehicle comprising:
   a window comprising a metallic coating;
   a wireless communication circuit comprising an antenna configured to communicate via a radio frequency, the antenna comprising an electrical conductor in conductive connection with the communication circuit, the electrical conductor configured to:
      be disposed interior to and in a spaced apart relationship with the window,
      extend substantially parallel to the metallic coating, and
      extend in a first direction;
   wherein the metallic coating comprises a plurality of elongated openings extending in a second direction forming a height of the elongated openings substantially perpendicular to the first direction, wherein the electrical conductor extends centrally along the height of the elongated openings.

19. The apparatus according to claim 18, wherein the plurality of elongated openings are evenly spaced and extend parallel relative to one another over a width.

20. The apparatus according to claim 19, wherein the antenna is configured to communicate at a target frequency and the height of the elongated openings is less than twice a wavelength of the target frequency.

21. The apparatus according to claim 1, wherein the window forms an interior surface enclosing a portion of an interior compartment.

\* \* \* \* \*